Oct. 11, 1938.　　　　T. WEBER　　　　2,133,065
COUPLER
Filed March 28, 1936　　　2 Sheets-Sheet 1
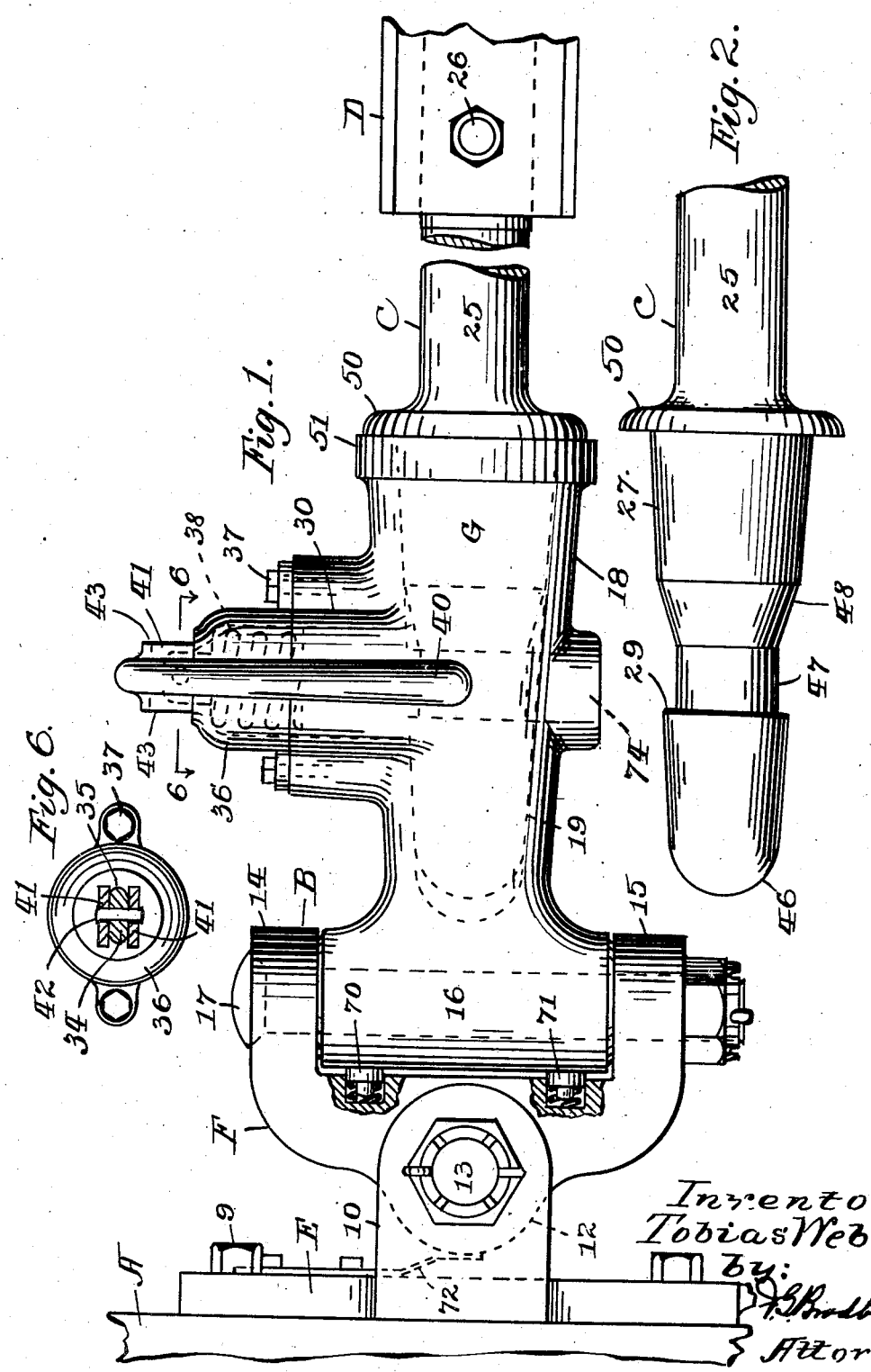

Oct. 11, 1938.　　　　T. WEBER　　　　2,133,065
COUPLER
Filed March 28, 1936　　　　2 Sheets-Sheet 2
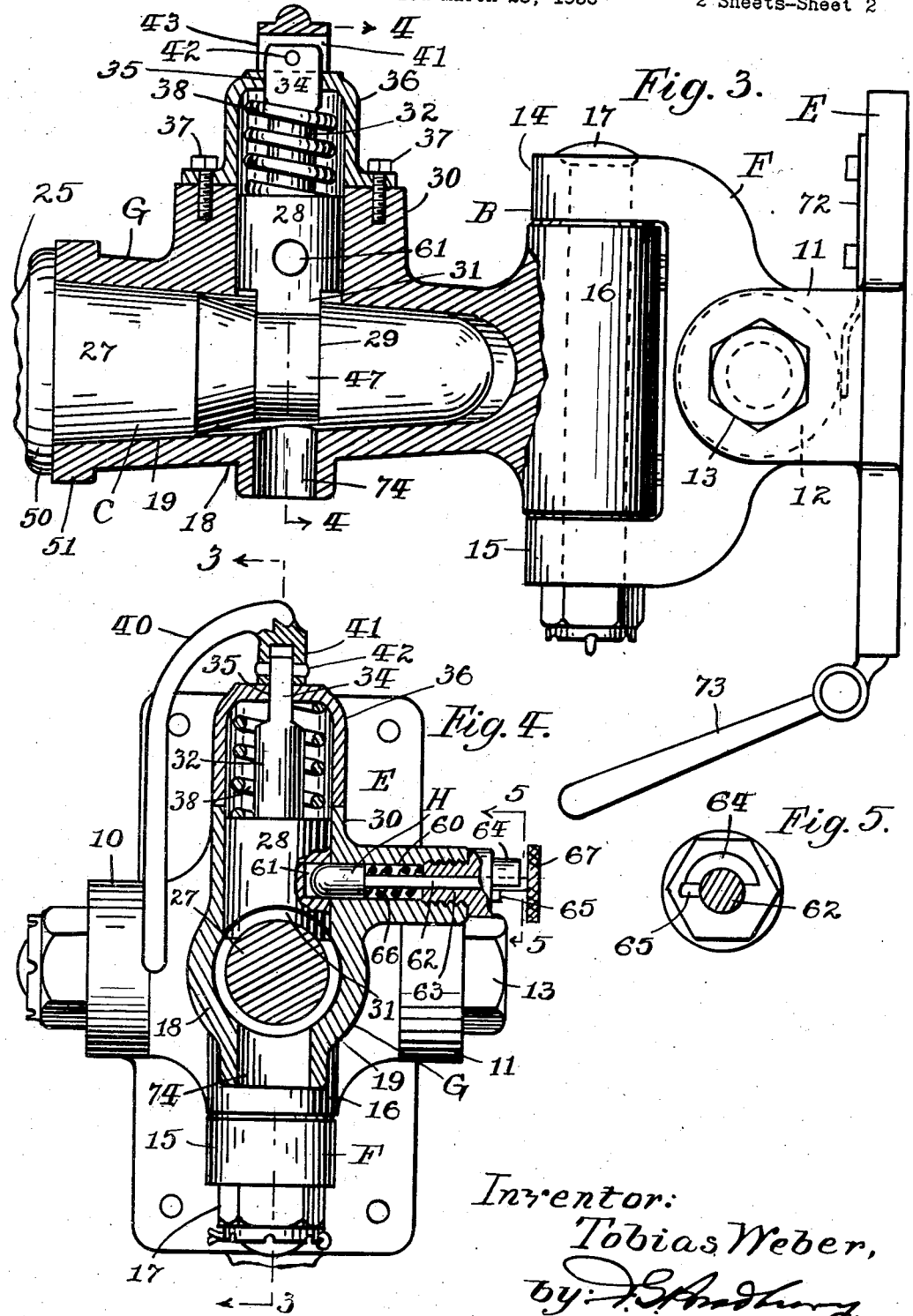
Inventor:
Tobias Weber,
by [signature]
Attorney.

Patented Oct. 11, 1938

2,133,065

UNITED STATES PATENT OFFICE 2,133,065

COUPLER

Tobias Weber, Los Angeles, Calif.

Application March 28, 1936, Serial No. 71,461

4 Claims. (Cl. 280—33.15)

My invention relates to an improved coupler and more particularly to that type which is adapted for attaching a drawn vehicle such as a trailer to a driving vehicle such as a motor driven truck.

Couplers for such service which have been and are in common use are subjected to a multiplicity of thrusting and torsion movements produced by rough roads and it is the primary object of this invention to provide a device of the kind stated which has complete universal freedom within wide limits and which will endure severe use with a minimum of wear and without breaking, straining or other disorder. Another object is to provide a coupler which will lock against unintentional uncoupling of the parts and which can be easily coupled or uncoupled whenever desired by an operator and without the use of tools. Another object is to provide a construction which is safeguarded against an operator having his hands caught and injured when the coupler parts are being connected or disconnected. A further object is to provide a coupler, the members of which will not rattle and become noisy when subjected to extensive use. Among still further objects are simplicity of construction and greater effectiveness in use than heretofore.

To these ends my invention comprises the features of construction and combination of parts hereinafter described and claimed.

In the accompanying drawings, forming part of this specification, Fig. 1 is a side elevation of my invention, fragments of a driving vehicle and the reach of a trailer being shown and portions of the universal clevis being broken away and in section to expose part of the anti-rattle devices; Fig. 2 is a side elevation of the pintle draw bar; Fig. 3 is a partial vertical longitudinal section, showing portions of the socket member, clevis, pintle draw bar and lock; Fig. 4 is a section taken on the line 4—4 of Fig. 3; Fig. 5 is a section of a detail taken on line 5—5 of Fig. 4, and Fig. 6 is a section of a detail taken on the line 6—6 of Fig. 1.

In the drawings, a fragment of the rear end of an automobile, constituting a power driven vehicle by which a trailer or other road vehicle or implement may be drawn is indicated by A. Secured thereto is a female coupling member B of my improvement, to which a pintle draw bar or coupling rod C, attached by a reach frame (a fragment D thereof being shown in Fig. 1) to the front end of the trailer or other implement to be drawn is adapted to be separably coupled. The female coupling member B is composed of three elements; a base E for attachment to the body or frame of a power driven vehicle such as by bolting at 9; a yoke F which is pivoted on the base to swing on an axis, and a socket member G which is pivoted on the yoke to swing on an axis transverse to the axis of the yoke on said base, whereby a universal joint is produced to permit free action. As illustrated the axis of the yoke on the base is relatively horizontal and the axis of the socket member G on the yoke is relatively vertical, whereby substantially vertical and horizontal movement between the pintle draw bar and coupling is fully compensated. The members E and F thus produce a universal clevis and their axes may be reversed if desired, that is the axis between the base and yoke may be disposed vertically or inclined and the axis between the yoke and socket member may be disposed horizontally or inclined within the spirit of my invention.

Base E is formed with a pair of flanges 10 and 11, between which the head 12 of yoke F is pivoted by the bolt 13, and said yoke is formed with a pair of arms or abutments 14 and 15, extending from its body 12, between which the cylindrical shaped head 16 of socket member G is pivoted by means of the bolt 17. Socket member G has a conical shaped body 18 expanding outwardly from the side of and integral with head 16 in which an inwardly tapering socket 19 is formed.

The pintle draw bar or coupling rod C has a shank 25 which is adapted to be secured by any suitable means to the trailer or other implement to be drawn. As shown a fragment D of an ordinary reach which is usually attached to the trailer is secured to the shank by bolting at 26. The forward end of shank 25 is formed with a forwardly tapering pintle 27, which is adapted to be rotatively seated in the socket 19, wherein it is held by a cylindrical bolt 28. The connection thus afforded allows the pintle coupling rod C to rotate and freely compensate for all lateral tilting action of the trailer. It will be noted that the coinciding surfaces between the pintle and socket members are long and taper gradually from end to end whereby an extremely broad rotative journal bearing is produced between the parts which is adapted to most effectively withstand longitudinal and lateral strains and impacts to which the device is subject. The lock bolt 28 is slidably mounted in a housing 30 on the side of the socket member to travel longitudinally along an axis transverse to the longitudinal axis of the socket member. The cylindrical body of the lock bolt is formed on its innermost end with a key 31 resembling a yoke which rotatively engages the shoulder 29 during the depressed position of the lock bolt to hold the pintle draw bar in the socket member. The outer end of the lock bolt has a longitudinal shank which in turn has its outer end 34 formed flat and extending through a slot 35 in the top of the cap 36 to prevent the lock bolt from turning but not retarding longitudinal sliding movement thereof. This cap 36 is held on the housing 30 by the bolts 37 or other suitable means and serves to hold a helical spring 38 which functions to automatically depress the lock bolt into pintle draw bar locking engagement. The lock bolt is raised to release the pintle draw bar by a release handle 40 which is formed with a double cam 41. This cam is pivoted to the head end 34 of the lock bolt shaft 32 by pin 42. The cam surfaces press against the outer end of the cap 36 when the handle 40 is turned from depending position in either direction to raise the lock bolt into superior unlocking position. When the handle is turned into substantially right angle position either one or the other of the flat edges 43 of cam 41 will serve to hold the handle and the lock bolt from unintentionally returning to locking position.

The outermost extremity of the pintle draw bar is rounded at 46 so as to slide freely below the innermost end of the lock bolt and cooperating with the tapering side of the pintle cause the lock bolt to raise automatically while the pintle is being thrust into the socket member until the key member 31 slips over and into engagement with annular shoulder 29, whereupon the pintle is prevented from being unintentionally disconnected until the lock bolt is raised or unlocked. In producing the annular shoulder 29, an annular groove 47 is formed in the pintle and a tapering shoulder 48 is provided to escape contact with the lock shoulder. Also to limit the inward thrust of the pintle into the socket and prevent binding, an annular guard 50 is provided which is free to rotate against the outer end 51 of the socket member G. This guard assures safety to the operator by preventing the hands from being caught and injured by the device while it is being coupled or uncoupled.

For the purpose of preventing unintentional uncoupling of the device, the lock bolt is locked in depressed locking position to prevent the pintle draw bar from being accidentally uncoupled, by a lock pin H. This pin is slidably seated in a cylindrical opening 60, through the side of the lock bolt housing 30 and is adapted to slide into and out of a lock pin receiving opening 61 in the side of the lock bolt. The lock pin has a shank 62 which is adapted to slide longitudinally through a bushing 63. This bushing is threaded into housing 30 and has a semi-annular shoulder 64 over which a pin 65 may be held to retain the lock pin in outermost lock bolt engaging position. A helical expansion spring 66 serves to urge the lock pin H into lock bolt engaging position. A shoulder 67 on the outer end of shank 62 enables the operator to actuate the lock pin. When it is desired to lock the lock bolt after the pintle draw bar has been coupled, handle 67 is turned until pin 65 disengages shoulder 64, whereupon lock pin H engages the lock bolt in opening 61. To permit releasing the lock bolt, the pin is raised against the action of spring 66 and turned until pin 65 engages and rides upon shoulder 64. By turning handle 40 into horizontal position, cam 41 will raise the lock bolt into pintle draw bar disengaging position and the draw bar may then be uncoupled.

In use the pintle draw bar may be easily inserted longitudinally into the socket member and automatically engaged by the lock bolt, whereupon the lock bolt may be locked against unintentional disengagement by releasing the lock pin H.

The angle of the tapering surfaces between the pintle and socket member is sufficient and the position of the guard such as to prevent the pintle from sticking to the socket member and making it difficult to uncouple the parts. Also the diameter of the guard is sufficient to reduce all danger of the operator's hand slipping and being injured when the parts are being coupled or uncoupled. A passageway 74 through the wall of the bottom of the socket member provides exit for foreign material in the socket member and thereby assists in maintaining an operative joint between the pintle draw bar and female coupling elements and between the lock bolt and pintle draw bar.

To prevent or reduce rattling if the parts of the coupler become worn, anti-rattle devices 70 and 71 are provided between the head 16 of the socket member G and the body 12 of yoke F and an anti-rattle spring 72 is interposed between the body 12 of yokes F and the base E which is secured to the driving vehicle. The base E is also provided with the usual link 73 (see Fig. 3) to which a safety emergency chain may be connected between the drawn and driving vehicles.

It is contemplated that the coupler may be reversed within the spirit of my invention, that is the female member mounted upon the trailer and the pintle draw bar member mounted upon the power driven vehicle in an equivalent sense.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to secure by Letters Patent is:

1. A coupling device, provided with a female socket member having a longitudinal tapering inner surface forming an inwardly tapering bearing seat substantially throughout its length, a pintle member having a coupling end rotatively seated in said socket member and provided with a companion tapering bearing surface substantially throughout the length of said socket member whereby a thrust bearing of maximum bearing surface is provided, said pintle member also having an annular groove between the ends of its tapering bearing surface, and means for releasably and rotatively holding said members coupled together by engagement with said pintle member in said groove, said means comprising a cylindrical lock bolt slidable in said socket member having a curved key entering and journaled upon said pintle in said groove.

2. A coupling device, provided with a female socket member having a longitudinal tapering inner surface forming an inwardly tapering bearing seat substantially throughout its length, a pintle member having a coupling end rotatively seated in said socket member and provided with a companion tapering bearing surface substantially throughout the length of said socket member whereby a thrust bearing of maximum bearing surface is provided, said pintle member also having an annular key engaging groove between the ends of its tapering bearing surface, and a spring pressed lock bolt reciprocable in the side of said socket member and provided with a key on its inner end resembling a segment of a collar entering and journaled in said groove and engaging said pintle to hold the socket and pintle members rotatively and releasably connected.

3. A coupling device, provided with a female socket member having a longitudinal tapering inner surface forming an inwardly tapering bearing seat substantially throughout its length, a pintle member having a coupling end rotatively seated in said socket member and provided with a companion tapering bearing surface substantially throughout the length of said socket member whereby a thrust bearing of maximum bearing surface is provided, said pintle member also having an annular key engaging groove between the ends of its tapering bearing surface, a spring pressed lock bolt reciprocable in the side of said socket member radially from the axis of said pintle and provided with a key on its inner end resembling a segment of a collar entering and journaled in said groove and engaging said pintle to hold the socket and pintle members rotatively and releasably connected, and means for locking said lock bolt with its key engaging said pintle member in said groove.

4. A coupling device, provided with a female socket member having a longitudinal tapering inner surface forming an inwardly tapering bearing seat substantially throughout its length, a pintle member having a coupling end rotatively seated in said socket member and provided with a companion tapering bearing surface substantially throughout the length of said socket member whereby a thrust bearing of maximum bearing surface is provided, said pintle member also having an annular key engaging groove between the ends of its tapering bearing surface, a spring pressed lock bolt reciprocable in the side of said socket member and provided with a key on its inner end resembling a segment of a collar entering and journaled in said groove and engaging said pintle to hold the socket and pintle members rotatively and releasably connected and a hand operable cam actuating element connected with said lock bolt for withdrawing the same and its key from engagement with said pintle member.

TOBIAS WEBER.